United States Patent
Scheerer

[15] 3,677,585
[45] July 18, 1972

[54] BALL JOINT FOR VEHICLE LINKAGES
[72] Inventor: Wolfgang Scheerer, Strump, Germany
[73] Assignee: A. Ehrenreich & Cie
[22] Filed: Sept. 22, 1970
[21] Appl. No.: 74,414

[30] Foreign Application Priority Data
Oct. 23, 1969 Germany ............... P 19 53 396.1

[52] U.S. Cl. .................................................... 287/87
[51] Int. Cl. ................................................... F16c 11/06
[58] Field of Search ........................ 287/90 R, 87, 90 C

[56] References Cited
UNITED STATES PATENTS 3,257,133 6/1966 Wight ............................ 287/87
3,008,743 11/1961 Westercamp ................ 287/85 A X
3,308,906 3/1967 Burke ........................... 287/90 R X
3,309,117 3/1967 Gottschald .................... 287/90 R

FOREIGN PATENTS OR APPLICATIONS 813,044 5/1959 Great Britain ...................... 287/90

Primary Examiner—Andrew V. Kundrat
Attorney—Arthur Schwartz

[57] ABSTRACT

A ball and socket joint wherein the bearing member positioned between the ball element and the joint housing is formed as an integral, unitary member with the housing cover.

3 Claims, 2 Drawing Figures

Patented July 18, 1972 3,677,585

INVENTOR
WOLFGANG SCHEERER

BY: Arthur Schwartz
ATTORNEY

BALL JOINT FOR VEHICLE LINKAGES

BACKGROUND OF THE INVENTION

1. Field of the Invention

The invention relates to ball joints, and in particular to ball joints for use in motor vehicles, for example, in their steering and wheel suspension linkages. The ball joint consists of a joint housing and a joint pin whose ball element is supported in the joint housing for omnidirectional motion. The ball joint has a bearing support for the ball element and a cover closure on its end opposite to the end where the pin extends from the joint housing.

2. Description of the Prior Art

Known ball joints of the type described above include, in addition to a separate hollow spherical bearing element inserted into the joint housing, a cover plate which is sealingly attached to the open end of the body. This will retain the bearing elements inside the body cavity and transmit to the latter the forces active on the joint pin. In the case of mass-produced articles such as these ball joints, any simplification and/or elimination of parts can represent a noticeable economy in production cost.

SUMMARY OF THE INVENTION

The objective underlying the present invention is to provide a ball joint without a separate cover, but which is nevertheless closed on the side opposite the side where the joint pin extends from the joint housing. In spite of the absence of a cover, per se, the bearing surface for the ball element on the side opposite to the joint pin passage is closed by a bearing element itself. The bearing element is inserted from this side into the joint housing thereby making it possible for the bearing elements to be made of a material which is more advantageous from a production standpoint and which has better bearing characteristics than the material of the joint housing.

According to the invention, the above objective is attained by providing a combined bearing element and cover plate in such a way that the bearing element simultaneously forms a closure in the manner of a plug, without requiring any increase in the dimensions of the joint housing.

Accordingly, the invention is characterized in that both the body closure and the bearing support of the ball element on the side of the housing closure consist of a single hollow spherical bearing plug. The bearing is inserted into the body bore and extends in the direction in which the ball stud extends from the joint body. The bearing plug is preferably made of a hard, injection-molded plastic material such as acetate resin, and is provided with a peripheral flange of a thickness sufficient to withstand the ball joint loads and strains. The flange rests on interior shoulders in the body formed by an enlarged diameter housing bore portion on the closure side of the housing. The upstanding edge of the joint housing is crimped over the flange of the bearing plug in the assembly operation.

In this manner a coverless but closed ball joint is obtained which has a bearing element which is inserted from the side to be closed. The combined cover and bearing element, when produced from injection molded plastic, requires no significant machining, or no machining at all. Therefore, not only is the cover plate eliminated, but also a very significant reduction in the total cost of the ball joint is achieved. The peripheral flange also serves as a sealing element.

BRIEF DESCRIPTION OF THE DRAWING

In the accompanying drawing is illustrated, by way of an example, an embodiment of the invention, represented in the various figures as follows.

DESCRIPTION OF THE PREFERRED EMBODIMENT

Figure 1:
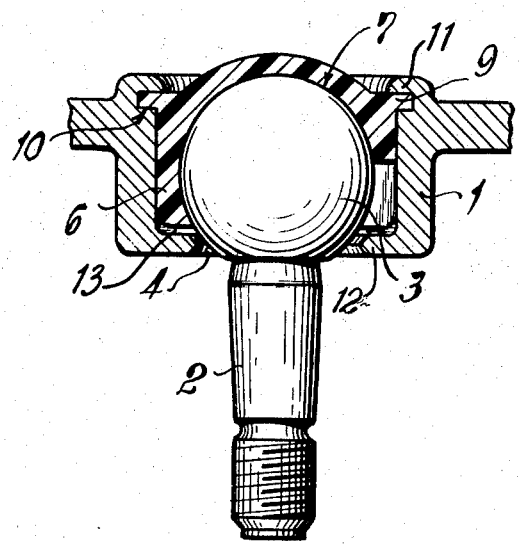
FIG. 1 shows in a vertical cross-section a ball joint embodying the invention.
Figure 2:
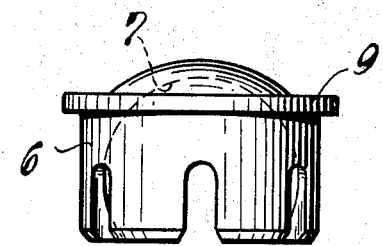
FIG. 2 shows in a front view the bearing element forming the socket and cover of the embodiment of FIG. 1.

In FIG. 1 is shown an embodiment of a ball joint comprising a joint housing or body and a joint pin or ball stud 2 with a ball element 3 wherein the pin 2 is supported in the housing 1 for omni-directional motion.

The joint housing has a joint pin passage 4, and from the side opposite this passage is inserted a bearing plug 6 made of a sufficiently hard plastic material such as acetate resin. The inside of the plug 6 has a hollow spherical surface 7 forming a bearing for the ball element 3. The surface 7 contacts the ball end. The bearing plug 6 extends in the direction of the joint pin passage 4 through the joint housing. On it closed side, the bearing plug 6 includes a peripheral flange 9. This flange is supported by an interior shoulder 10 of the joint housing which is formed by an enlarged-diameter portion in the housing bore. During assembly, the initially upstanding edge 11 of the joint housing 1 is crimped over the peripheral flange 9 of the plug 6. The peripheral flange is made thick enough to withstand the ball joint loads and strains, so that the crimped body edge 11 safely holds the bearing plug 6 in position inside the joint housing bore.

The housing 1 also has an inturned lower flange 12 surrounding opening 4, while the bearing 6 extends in a direction toward the inturned lower flange, terminating a distance therefrom seen as open space 13.

I claim:

1. A ball and socket joint unit comprising:
    a. a joint housing;
    b. a ball member in said housing;
    c. a joint pin attached to said ball member and extending outwardly from said housing;
    d. a bearing in said housing between said ball member and the interior wall of said housing providing a bearing surface for relative movement between said ball member and said housing;
    e. a cover member formed integrally with said bearing, whereby said bearing and cover are a unitary member having a peripheral flange thereon, said flange having a thickness sufficient to withstand the ball and socket joint loads and strains, said flange resting on a shoulder of said housing;
    f. said housing having a crimped portion clamping said flange to said shoulder and thereby forming a seal;
    g. said housing further having an inturned lower flange on the side opposite said crimped portion and adjacent to said joint pin;
    h. said bearing extending in a direction toward said inturned lower flange and terminating a distance therefrom, whereby said bearing member is held, solely by said crimped portion.

2. A ball and socket joint as defined in claim 1 wherein said unitary member is of a hard plastic material.

3. A ball and socket joint as defined in claim 2, wherein said material is acetate resin.

* * * * *